United States Patent
Cho et al.

(10) Patent No.: US 7,928,388 B2
(45) Date of Patent: Apr. 19, 2011

(54) INFRARED DETECTION SENSOR AND METHOD OF FABRICATING THE SAME

(75) Inventors: Seong Mok Cho, Daejeon (KR); Ho Jun Ryu, Seoul (KR); Woo Seok Yang, Daejeon (KR); Sang Hoon Cheon, Daejeon (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/648,161

(22) Filed: Dec. 28, 2009

(65) Prior Publication Data

US 2011/0042569 A1  Feb. 24, 2011

(30) Foreign Application Priority Data

Aug. 21, 2009  (KR) .................. 10-2009-0077760

(51) Int. Cl.
*G01J 5/00* (2006.01)
(52) U.S. Cl. .................................................. 250/338.3
(58) Field of Classification Search .... 250/338.1–338.4, 250/339.01–339.15
See application file for complete search history.

(56) References Cited

U.S. PATENT DOCUMENTS

| 5,831,266 A * | 11/1998 | Jerominek et al. | ......... 250/338.4 |
| 6,144,285 A | 11/2000 | Higashi | |
| 2007/0215807 A1 * | 9/2007 | Tohyama | ................... 250/338.1 |

FOREIGN PATENT DOCUMENTS

| JP | 2001-281065 | 10/2001 |
| KR | 1020090065941 A | 6/2009 |

OTHER PUBLICATIONS

Mahmoud Almasri et al., "Self-Supporting Uncooled Infrared Microbolometers With Low-Thermal Mass," Journal of Microelectromechanical Systems, Sep. 2001, pp. 469-476, vol. 10 No. 3, IEEE.

* cited by examiner

*Primary Examiner* — David P Porta
*Assistant Examiner* — Kiho Kim

(57) ABSTRACT

In an infrared detection sensor according to the present invention, all material constituting an upper portion of a sensing electrode in a supporting arm region is removed so that a supporting arm has low thermal conductivity. As a result, thermal conductivity of the infrared sensor structure is reduced, and the infrared detection sensor has excellent sensitivity.

12 Claims, 16 Drawing Sheets

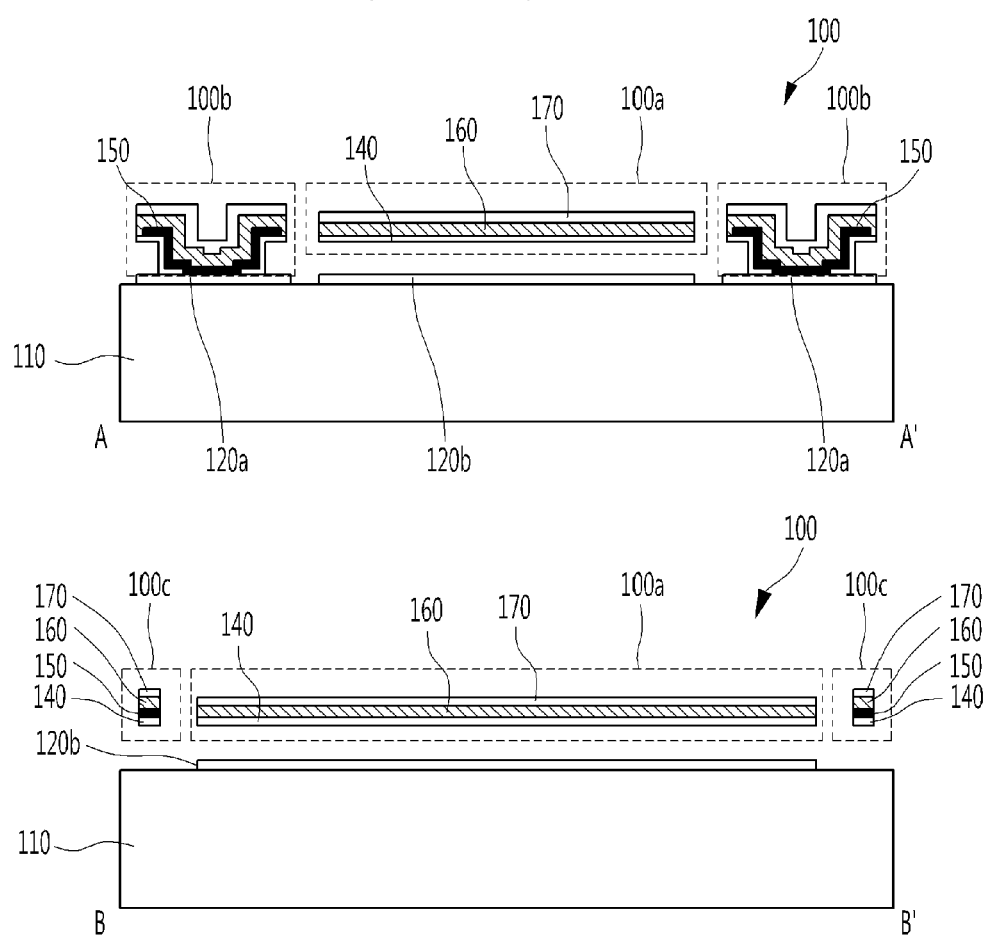

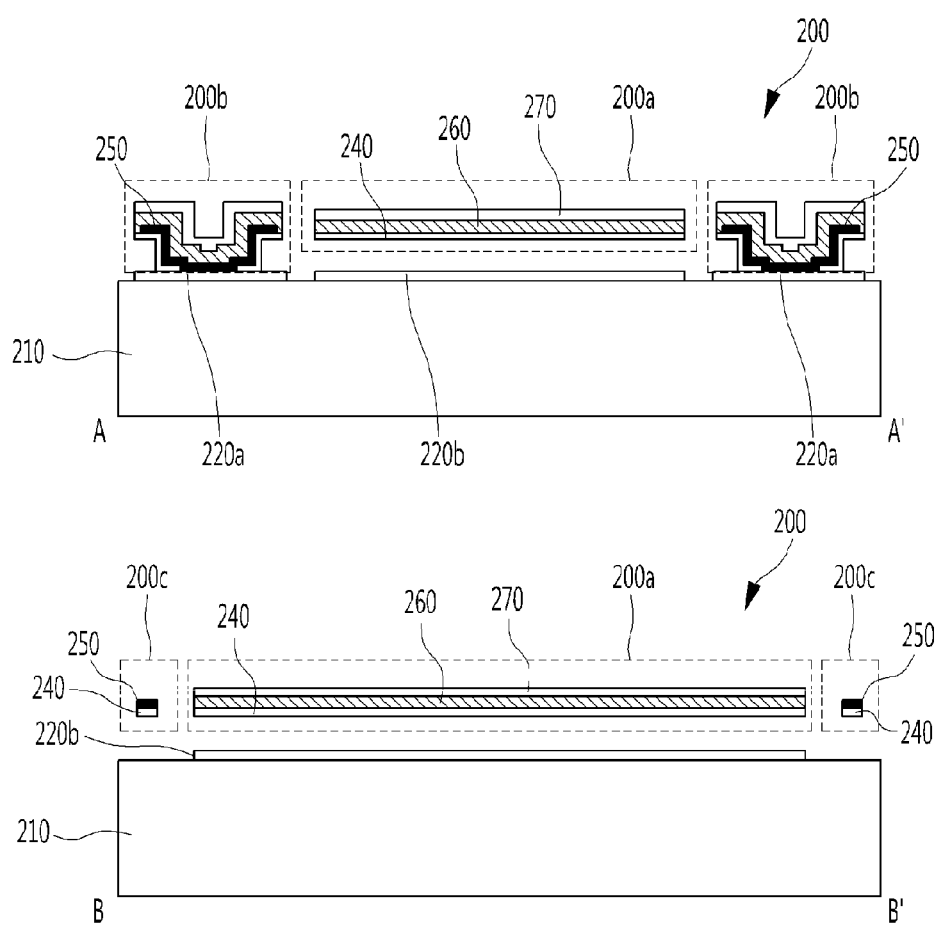

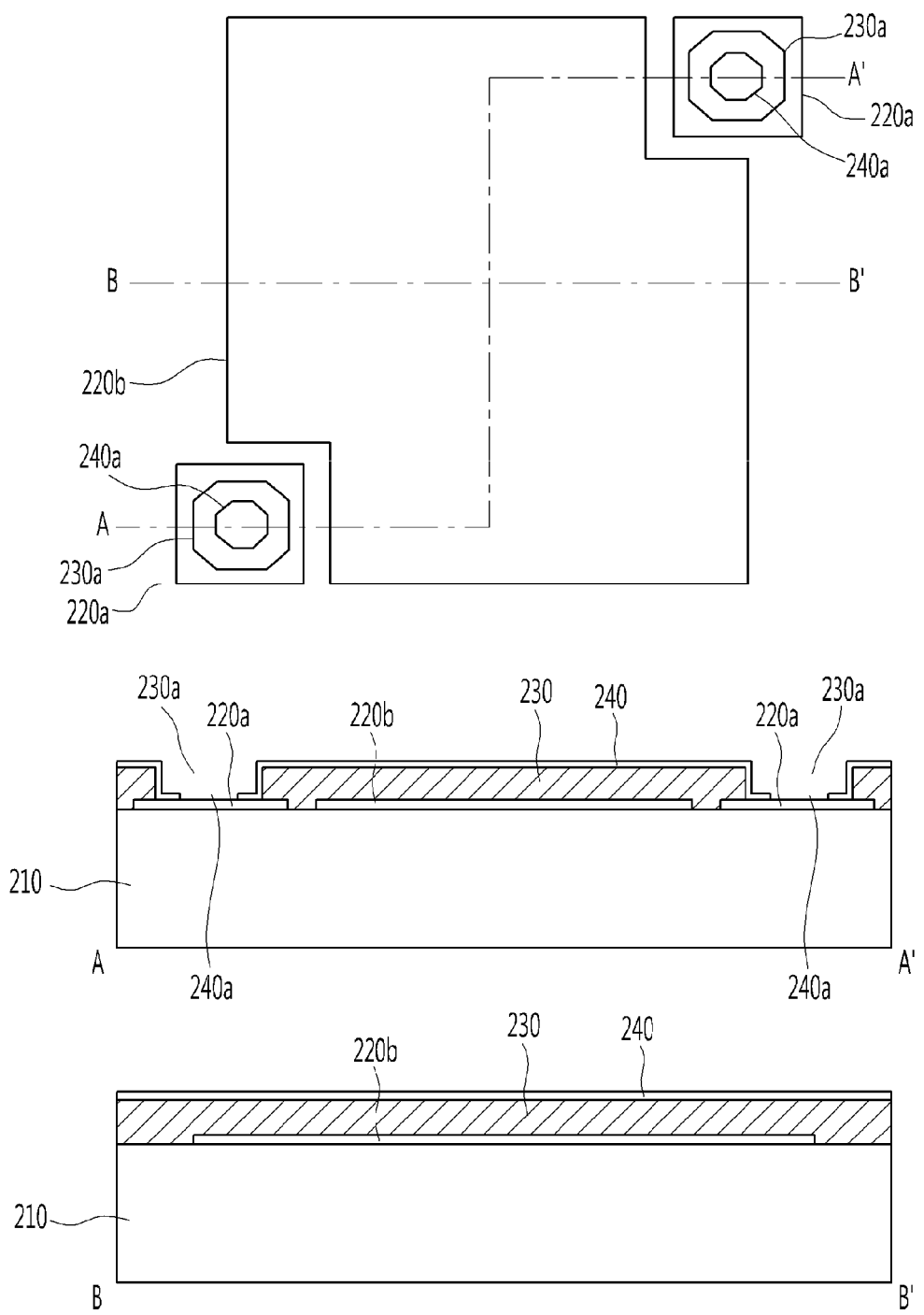

INFRARED DETECTION SENSOR AND METHOD OF FABRICATING THE SAME

CROSS-REFERENCE TO RELATED APPLICATION

This application claims priority to and the benefit of Korean Patent Application No. 10-2009-0077760, filed Aug. 21, 2009, the disclosure of which is incorporated herein by reference in its entirety.

BACKGROUND

The present invention relates to an infrared detection sensor and a method of fabricating the same. More specifically, the present invention relates to an infrared detection sensor having improved sensitivity by a thin supporting arm having low thermal conductivity, and a method of fabricating the same.

DISCUSSION OF RELATED ART

An uncooled type infrared detection sensor is a device employed for detecting a change in electrical conductivity or capacitance caused by heat generated when infrared is absorbed, and this uncooled type infrared detection sensor can be classified into a pyroelectric sensor, a thermopile sensor and a bolometric sensor according to a method of sensing a change in temperature.

Among these, the bolometric infrared detection sensor detects a change in electrical resistance of a sensing layer caused by an increase in temperature and senses an infrared ray based on the change in electrical resistance.

FIG. 1A is a schematic view of a conventional bolometric infrared detection sensor, and FIG. 1B is a cross-sectional view taken along line A-A' and line B-B' in FIG. 1A, illustrating the infrared detection sensor shown in FIG. 1A;

Referring to FIGS. 1A and 1B, a conventional bolometric infrared detection sensor 100 includes a sensor structure 100a spaced a predetermined distance from a substrate, an anchor 100b formed on the substrate 110 and having a predetermined thickness, and a supporting arm 100c extending from the anchor 100b to support the sensor structure 100a.

The infrared detection sensor 100 corresponds to one unit pixel, and a VGA infrared detection sensor generally has a unit pixel array of 640×480.

In the sensor structure 100a, a lower protection layer 140, a sensing layer 160 and an upper protection layer 170 are stacked, and the lower protection layer 140, a sensing electrode 150, the sensing layer 160 and the upper protection layer 170 are stacked in the anchor 100b and the supporting arm 100c.

In order to embody the infrared detection sensor having the above structure to have high sensitivity, the sensor structure should have maximum thermal insulation. However, when a pitch between the unit pixels is reduced in order to enhance a resolution, it is impossible to lengthen the supporting arm to obtain sufficient thermal insulation. Also, when the supporting arm is formed in a complex shape to increase its length, an area occupied by the supporting arm becomes excessive, and thus the performance of the sensor is deteriorated.

In view of the above, a multi-layered infrared detection sensor in which a first-layered substrate, a second-layered supporting arm and a third-layered sensor structure are formed has been disclosed. However, the infrared detection sensor having the above structure has disadvantages that a complicated fabricating process is required for forming a multi-layered structure, and thus the manufacturing cost becomes high and production yield becomes low.

SUMMARY OF THE INVENTION

The present invention is directed to enhance the sensitivity of an infrared detection sensor by forming a supporting arm having low thermal conductivity through a simple process.

One aspect of the present invention provides an infrared sensor including: a substrate on which a metal pad and a reflection layer are formed; a sensor structure spaced a predetermined distance from the reflection layer and including a sensing layer having a resistance value which is varied according to a change in temperature, a lower protection layer formed below the sensing layer and an upper protection layer formed on the sensing layer; an anchor formed on the metal pad and having a predetermined thickness, the anchor including the sensing layer, a sensing electrode formed below the sensing layer to transmit a change in resistance of the sensing layer to the metal pad, the lower protection layer and the upper protection layer; and a supporting arm extending from the anchor to support the sensor structure. Here, the sensing layer formed on the sensing electrode and the upper protection layer are removed from the supporting arm region to form the supporting arm composed of the sensing electrode and the lower protection layer.

Another aspect of the present invention provides a method of fabricating an infrared detection sensor, including: forming a metal pad and a reflection layer on a substrate in which a read-out integrated circuit is formed, and forming a sacrificial layer having a predetermined thickness on the substrate; forming a lower protection layer on the sacrificial layer, and forming a sensing electrode on an anchor region and a supporting arm region; forming a sensing layer to cover the sensing electrode, and forming an upper protection layer on the sensing layer; patterning the upper protection layer, the sensing layer and the lower protection layer, and forming a sensor structure and a supporting arm; and etching the sacrificial layer. Here, in patterning the upper protection layer, the sensing layer and the lower protection layer, the upper protection layer and the sensing layer formed on the sensing electrode in the supporting arm region are removed by the patterning process to form the supporting arm composed of the sensing electrode and the lower protection layer.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 1B is a cross-sectional view taken along line A-A' and line B-B' in FIG. 1A, illustrating the infrared detection sensor shown in FIG. 1A;

FIG. 2B is a cross-sectional view taken along line A-A' and line B-B' in FIG. 2A, illustrating the infrared detection sensor shown in FIG. 2A; and FIG. 3A to FIG. 3L illustrate a method of fabricating an infrared detection sensor according to an exemplary embodiment of the present invention.

DETAILED DESCRIPTION OF EMBODIMENTS

Figure 1A:
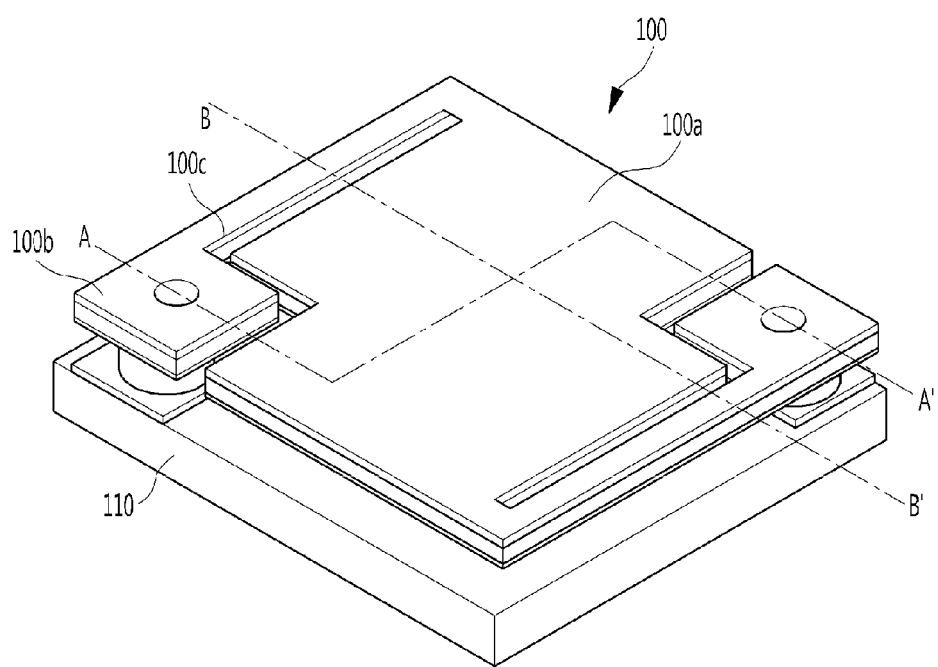
FIG. 1A is a view schematically showing a conventional bolometer type infrared detection sensor.

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. When it is determined that the detailed descriptions of a related known function or configuration may make the purpose of the present invention unnecessarily ambiguous in describing the present invention, the detailed descriptions will be omitted here. Throughout this specification, when an element is referred to as "comprising," "including," or "having" a component, it does not preclude another component but may further include the other component unless the context clearly indicates otherwise. In the drawings, the thickness of layers and regions may be exaggerated for clarity. When a layer is referred to as being "on" another layer or a substrate, it can be directly formed on the other layer or the substrate or an intervening layer may be present.

Figure 2A:
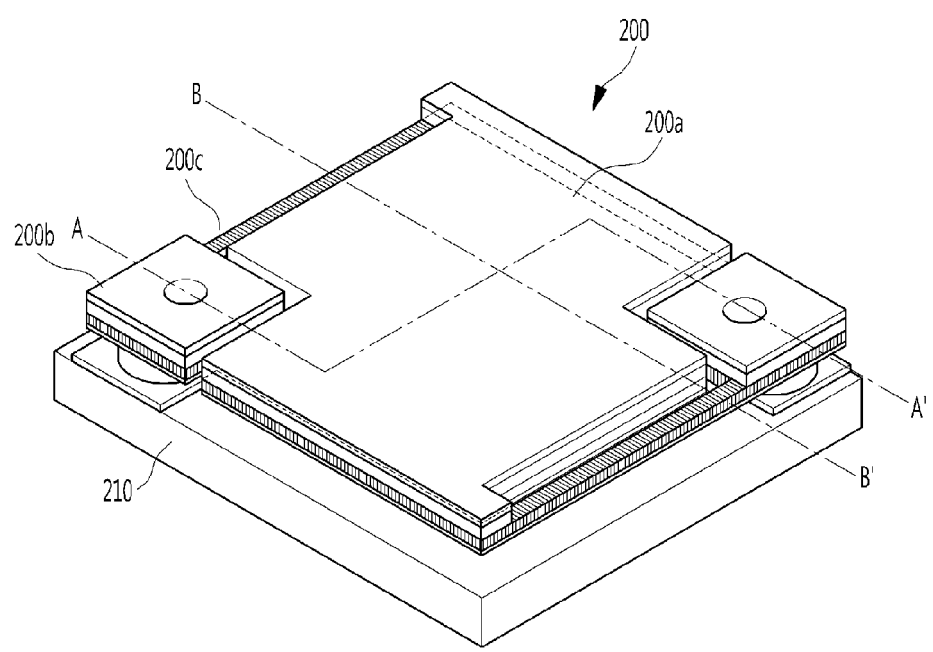
FIG. 2A is a schematic view of an infrared detection sensor according to an exemplary embodiment of the present invention.

FIG. 2A is a schematic view of an infrared detection sensor according to an exemplary embodiment of the present invention, and FIG. 2B is a cross-sectional view taken along line A-A' and line B-B' in FIG. 2A, illustrating the infrared detection sensor shown in FIG. 2A.

Referring to FIGS. 2A and 2B, an infrared detection sensor 200 according to an exemplary embodiment of the present invention includes a substrate 210 on which a metal pad 220a and a reflection layer 220b are formed; a sensor structure 200a spaced a predetermined distance apart from the reflection layer 220b; an anchor 200b formed on the metal pad 220a and having a predetermined thickness; and a supporting arm 200c extending from the anchor 200b to support the sensor structure 200a.

A read-out integrated circuit (not shown) is formed in the substrate 210, and the metal pad 200a is electrically connected to the read-out integrated circuit.

The sensor structure 200a includes a sensing layer 260 with a resistance value varied according to a change in temperature caused when infrared is absorbed, and a lower protection layer 240 and an upper protection layer 270 for protecting the sensing layer 260.

The anchor 200b is formed at each of two opposite corners of the sensor structure 200a and includes the sensing layer 260 with a resistance value varied according to a change in temperature caused when infrared is absorbed, a sensing electrode 250 for transmitting a change in resistance of the sensing layer 260 to the metal pad 220a and the lower protection layer 240 and the upper layer 270 for protecting the sensing layer 260.

The supporting arm 200c includes a sensing electrode 250 extending and bent in an "L" shape from the anchor 200b and the lower protection layer 240.

As compared with the conventional supporting arm 100c (see FIG. 1B), all material constituting an upper portion of the sensing electrode 250 is removed so that the supporting arm 200c has a remarkably thin thickness. As a result, the supporting arm 200c has a lower thermal conductivity than the conventional supporting arm 100c.

Accordingly, due to the low thermal conductivity of the supporting arm 200c, the thermal insulating properties of the sensor structure 200a are improved, and thus the temperature sensitivity of the infrared detection sensor is enhanced.

In addition, since there is no need to complicate a shape of the supporting arm or lengthen the supporting arm in order to lower the thermal conductivity of the supporting arm, a high fill-factor can be obtained.

In the meantime, although the structure described with regard to this exemplary embodiment does not have an absorbent layer, an absorbent layer may be formed on the lower protection layer 240 or the upper protection layer 270 according to necessity.

FIG. 3A to FIG. 3L illustrate a method of fabricating an infrared detection sensor according to an exemplary embodiment of the present invention.

For the convenience of explanation, a plane view and cross-sectional views taken along lines A-A' and B-B' of FIG. 2A are illustrated in each of the drawings. In order to simplify the drawings, a sacrificial layer, a lower protection layer, a sensing electrode, a sensing layer and an upper protection layer are omitted from the plane view of each drawing.

Figure 3A:
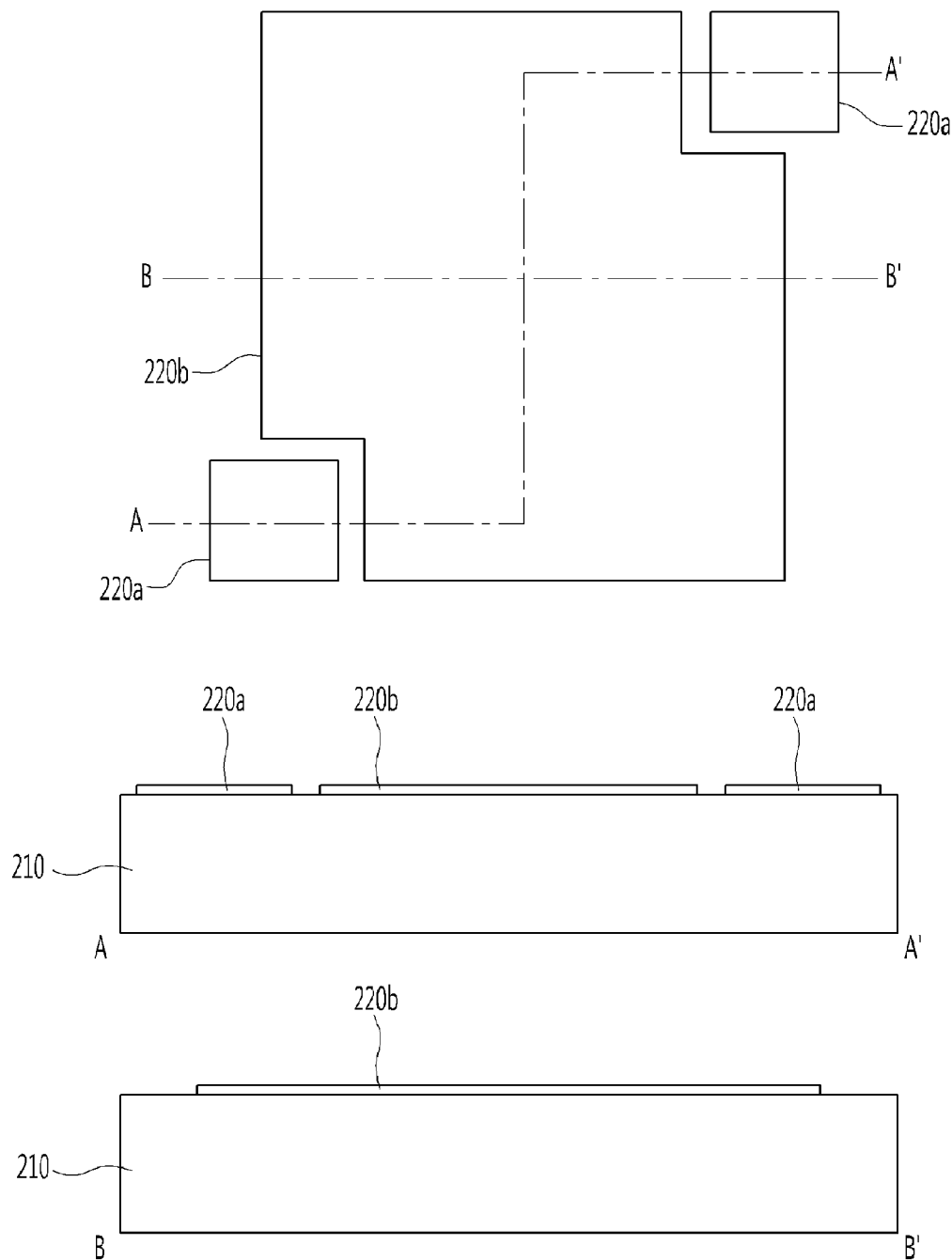

First of all, as shown in FIG. 3A, a substrate 210 having a read-out integrated circuit (not shown) formed therein is provided. A metal pad 220a and a reflection layer 220b are then formed on the substrate 210.

Here, a metal material such as aluminum, titanium or titanium nitride may be deposited on the substrate 210 to form a metal thin layer and the metal thin layer is then patterned to simultaneously form the metal pad 220a and the reflection layer 220b.

Figure 3B:
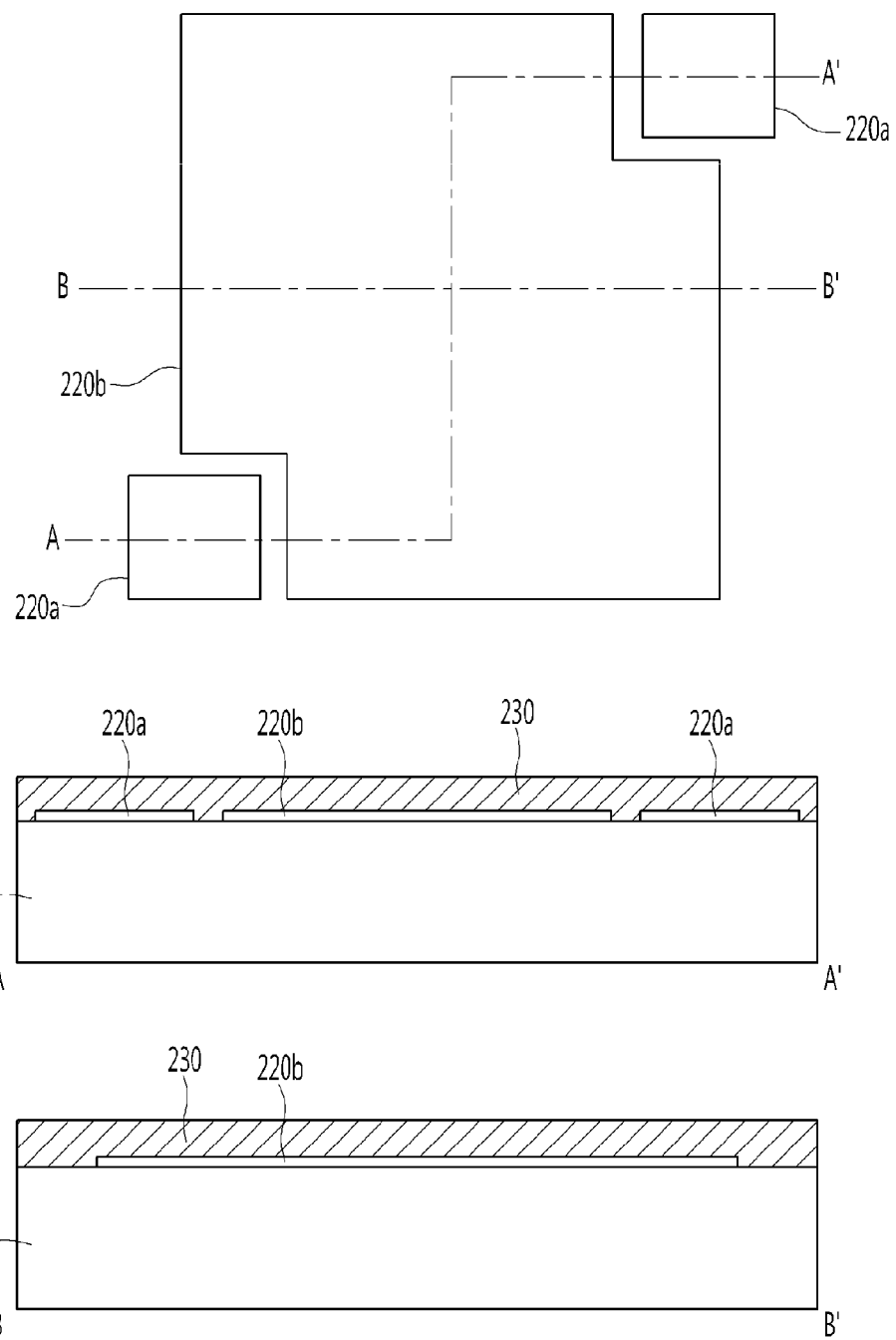

Subsequently, as shown in FIG. 3B, a sacrificial layer 230 having a predetermined thickness is formed on the substrate 210 on which the metal pad 220a and the reflection layer 220b are formed.

Here, the sacrificial layer 230 is formed of a polyimide-based organic material and a thickness of the sacrificial layer 230 is determined according to a wavelength of the infrared ray to be detected. For example, if the infrared detection sensor is utilized for detecting an infrared ray with a wavelength of 10 μm, it is preferable that the thickness of the sacrificial layer 230 is approximately 2 μm. A technique for determining the thickness of the sacrificial layer 230 is well known to those skilled in the art, and thus a detailed description thereof will be omitted.

Figure 3C:
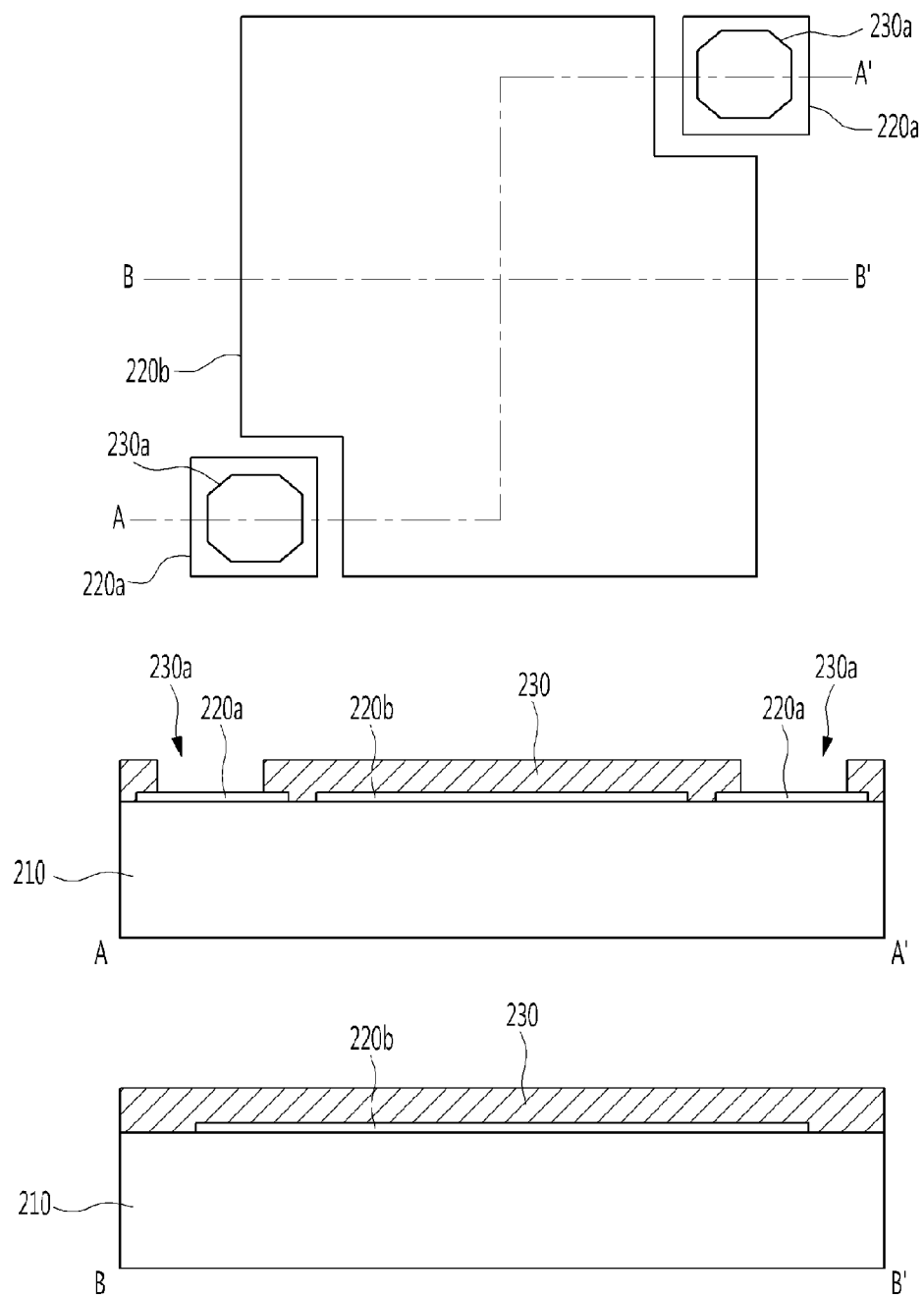

As shown in FIG. 3C, an anchor pattern 230a is then formed on the sacrificial layer 230 to form the anchor.

Figure 3D:
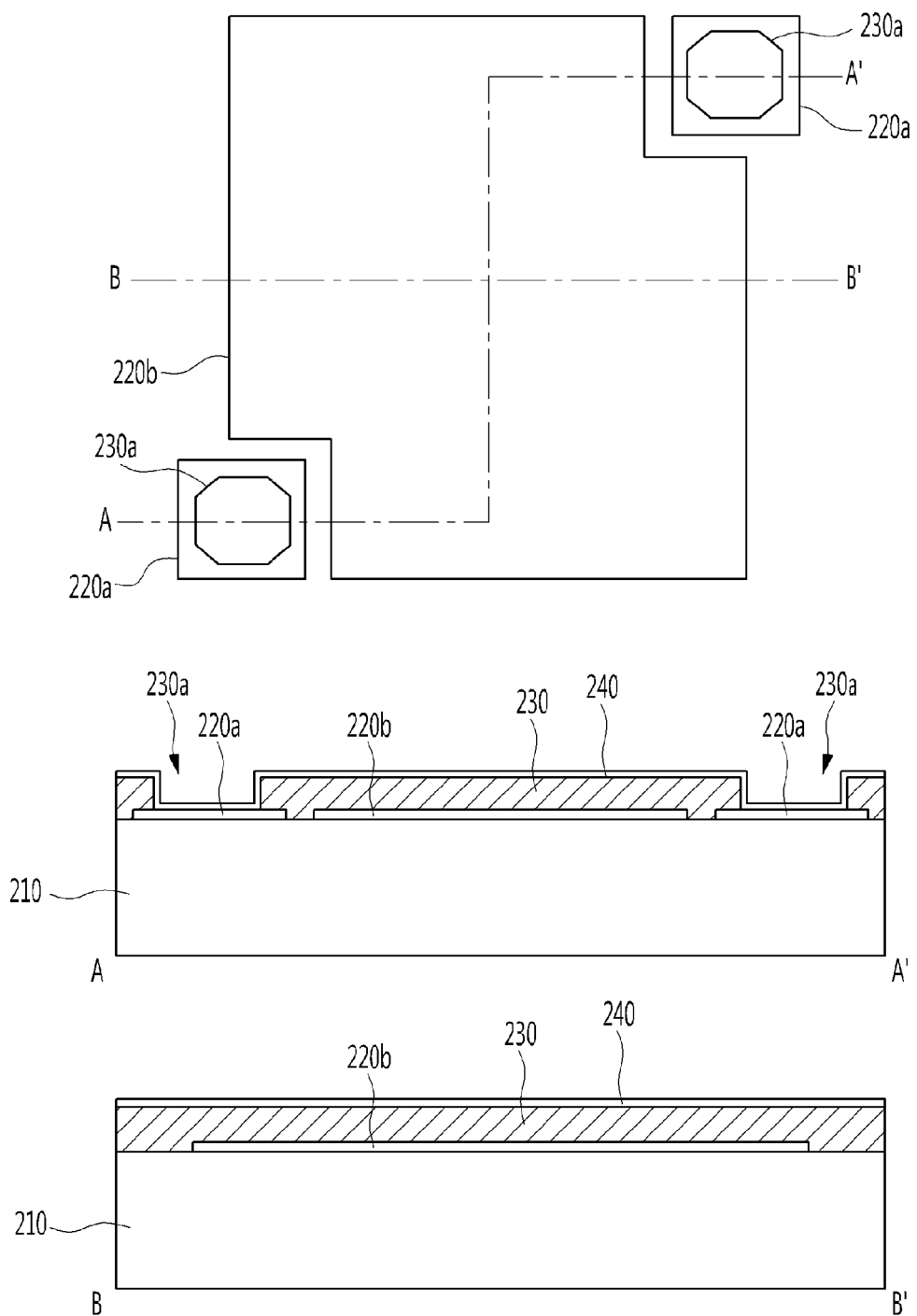

Subsequently, as shown in FIG. 3D, the lower protection layer 240 is formed on the sacrificial layer 230 on which the anchor pattern 230a is formed.

Here, a silicon nitride layer or a silicon oxide layer may be utilized as the lower protection layer 240, and the deposition method thereof may be chemical vapor deposition (CVD) method, by which excellent deposition uniformity is obtained in a stepped region.

Then, as shown in FIG. 3E, a contact hole 240a is formed on the lower protection layer 240 to expose the metal pad 220a.

Figure 3F:
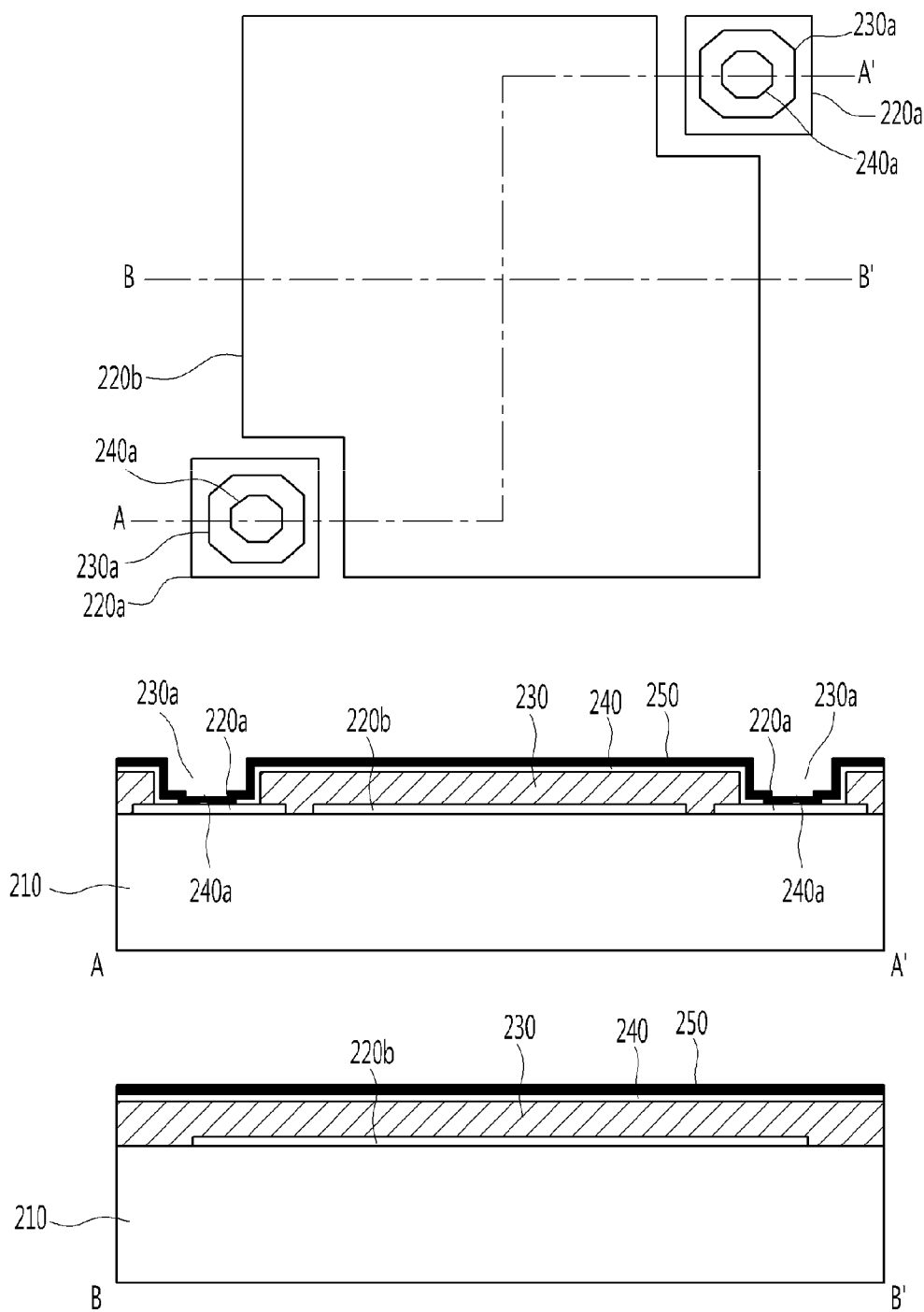

Subsequently, as shown in FIG. 3F, a sensing electrode 240 is formed such that the sensing electrode is in contact with the contact hole 240a.

Here, titanium, titanium nitride, or a nickel-chrome alloy may be utilized for forming the sensing electrode 250.

At this time, when an electrical connection is unstable due to the thin sensing electrode 250 because a step height of the anchor pattern 230a adjacent to the contact hole 240a is too large, a subsidiary metal layer may be formed above or below the sensing electrode 250. In this case, the subsidiary metal layer is patterned independently of the sensing electrode 250.

Figure 3G:
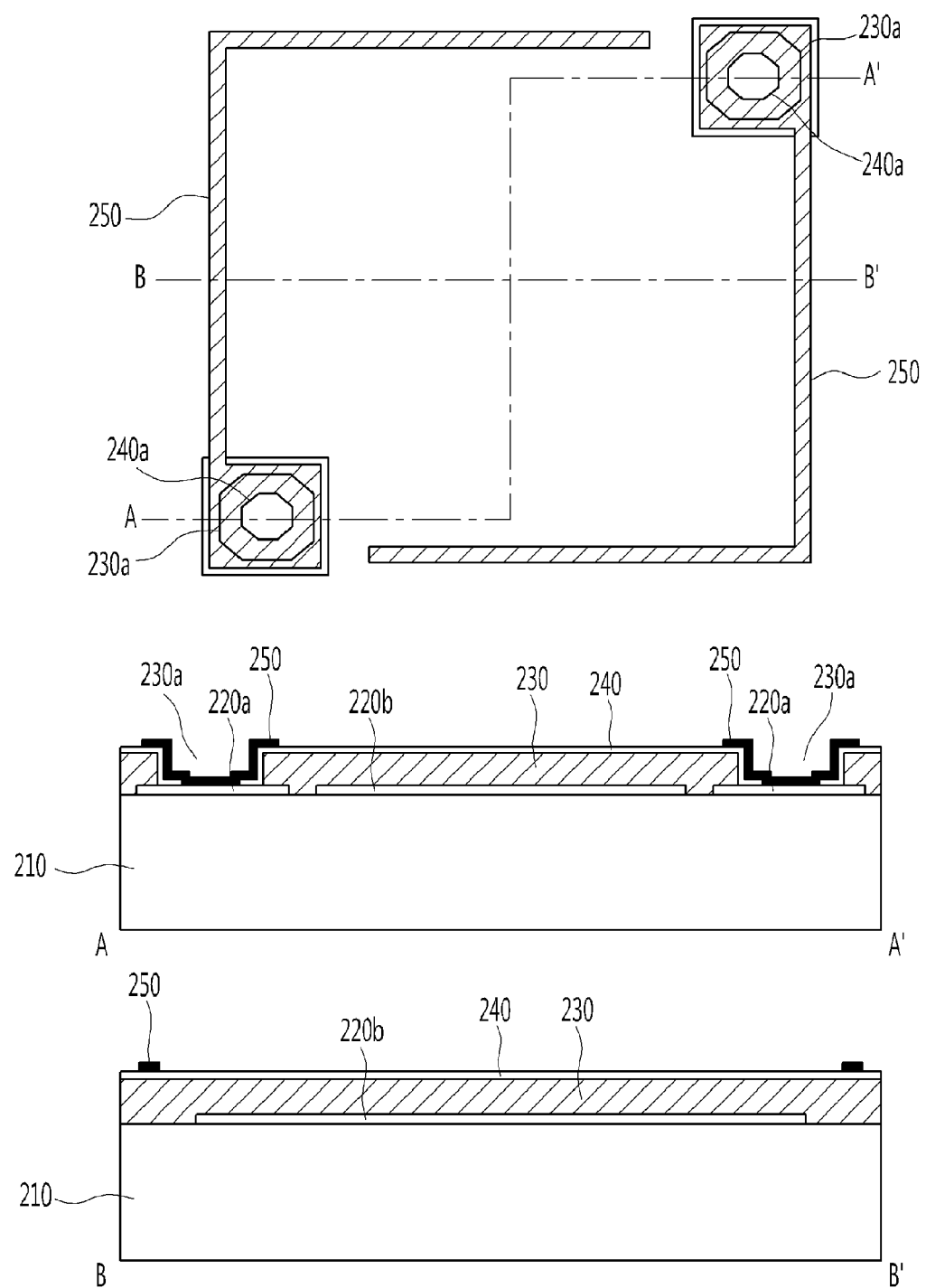

Then, as shown in FIG. 3G, the sensing electrode 250 is patterned such that the sensing electrode 250 remains only on the anchor region and the supporting arm. For reference, the reflection layer 220b is not shown in the plan views of FIG. 3G to FIG. 3L to simplify the drawings.

Figure 3H:
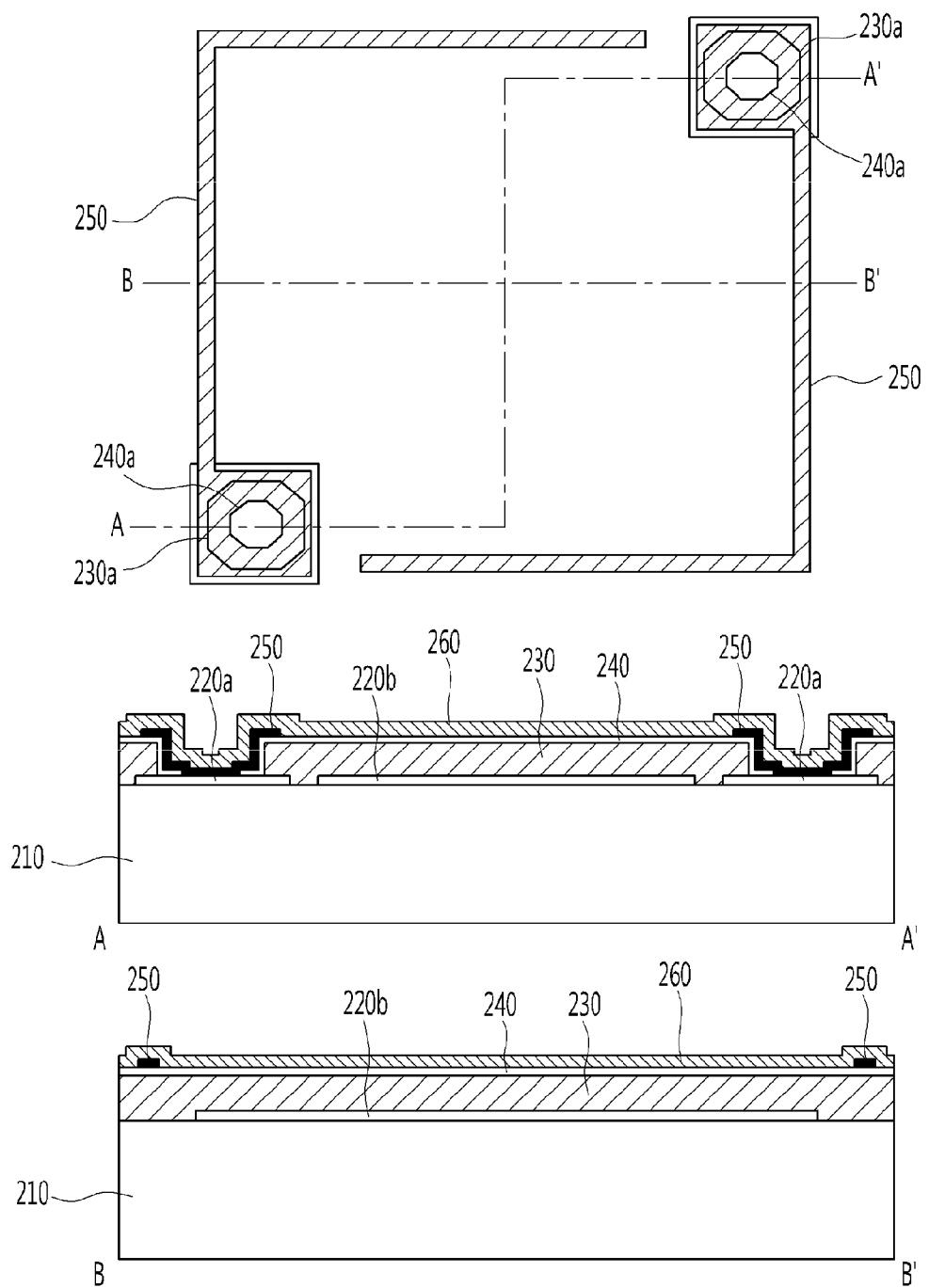

Next, as shown in FIG. 3H, a sensing layer 260 is formed to cover the sensing electrode 250.

Here, the sensing layer 260 may be formed of a material whose resistance is varied according to a change in temperature, for example, any one of amorphous silicon, polycrystalline silicon and vanadium oxide.

Figure 3I:
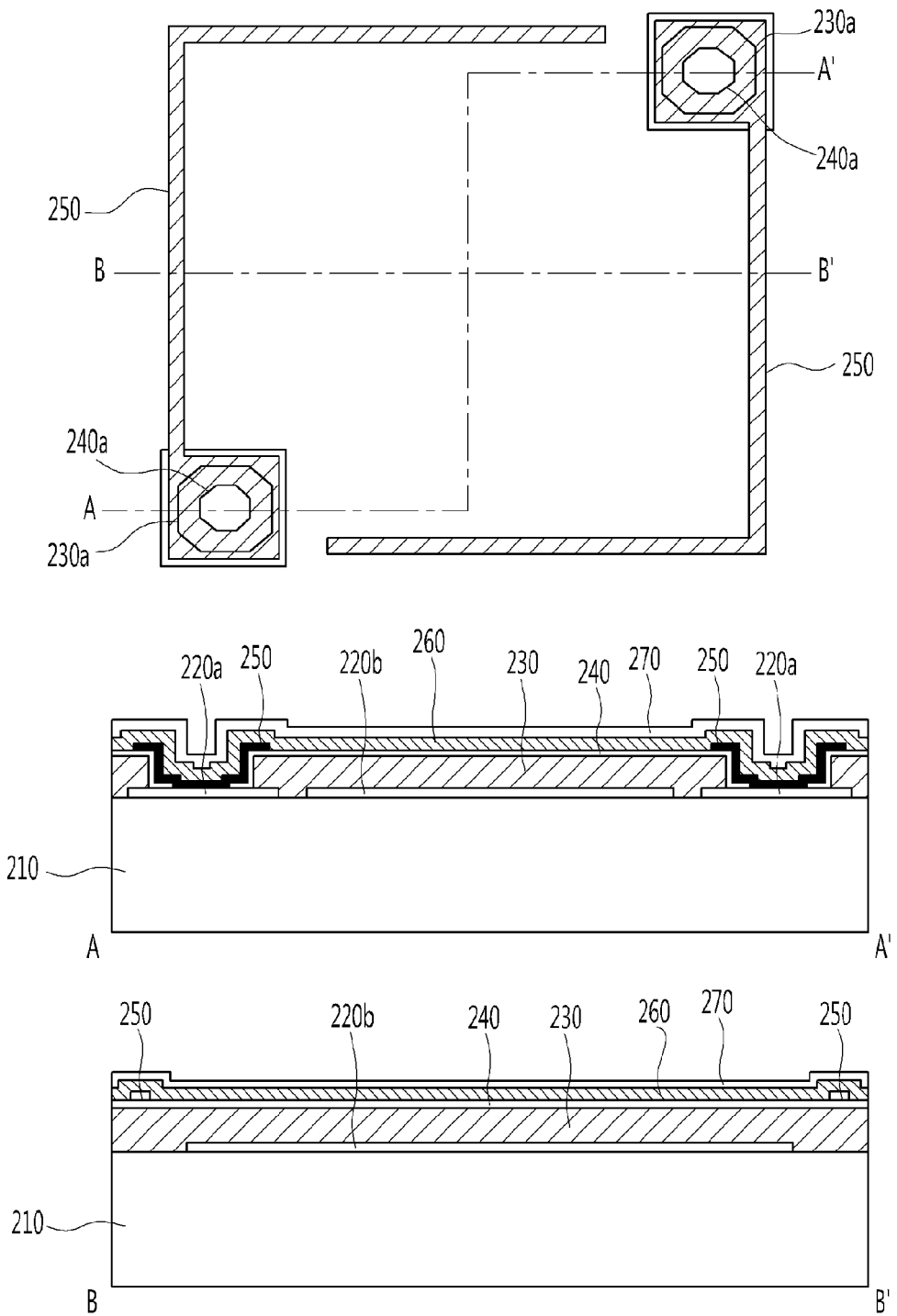

Subsequently, as shown in FIG. 3I, an upper protection layer 270 is formed on the sensing layer 260.

Here, a silicon nitride layer or a silicon oxide layer may be utilized as the upper protection layer 270.

Figure 3J:
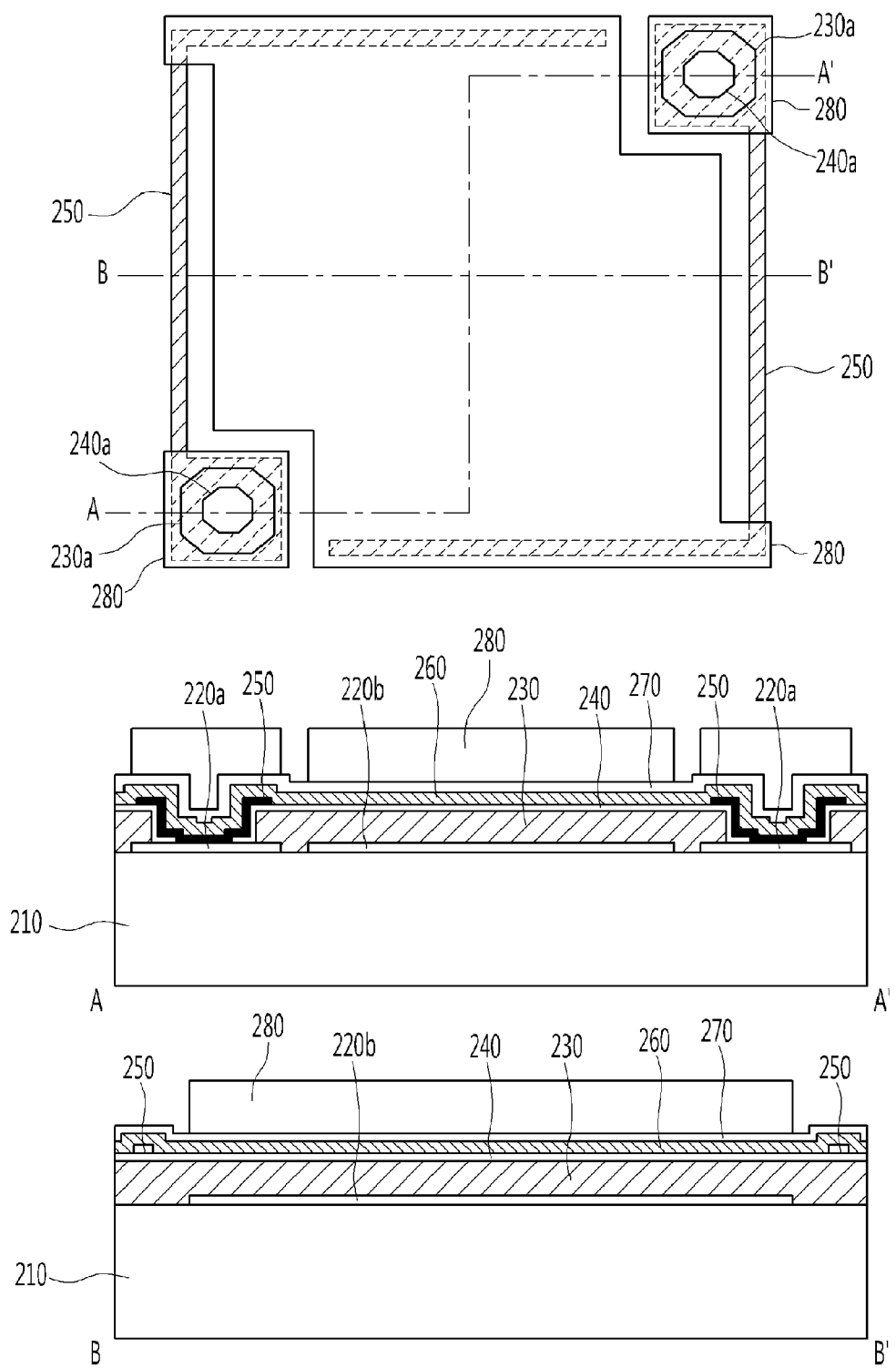

Then, as shown in FIG. 3J, photoresist patterns 280 are formed on the sensor structure region and the anchor region. At this time, the photoresist pattern 280 is not formed on the supporting arm region.

Subsequently, the upper protection layer 270, the sensing layer 260 and the lower protection layer 240 are sequentially patterned through a dry etching process using the photoresist pattern 280 as a protection layer, to form the sensor structure and the supporting arm.

On the supporting arm region, at this time, the upper protection layer 270 and the sensing layer 260 are patterned through a dry etching process to expose the sensing electrode 250. And, after the sensing electrode 250 is exposed, etching is no longer performed due to a high etch selectivity of the sensing electrode 250.

Here, plasma using a mixture gas including at least one of tetrafluoromethane ($CF_4$), fluoroform ($CHF_3$), argon (Ar), and oxygen (O) may be utilized in the dry etching process, and the well-known reactive ion etching process may be performed as the above dry etching process.

Figure 3K:
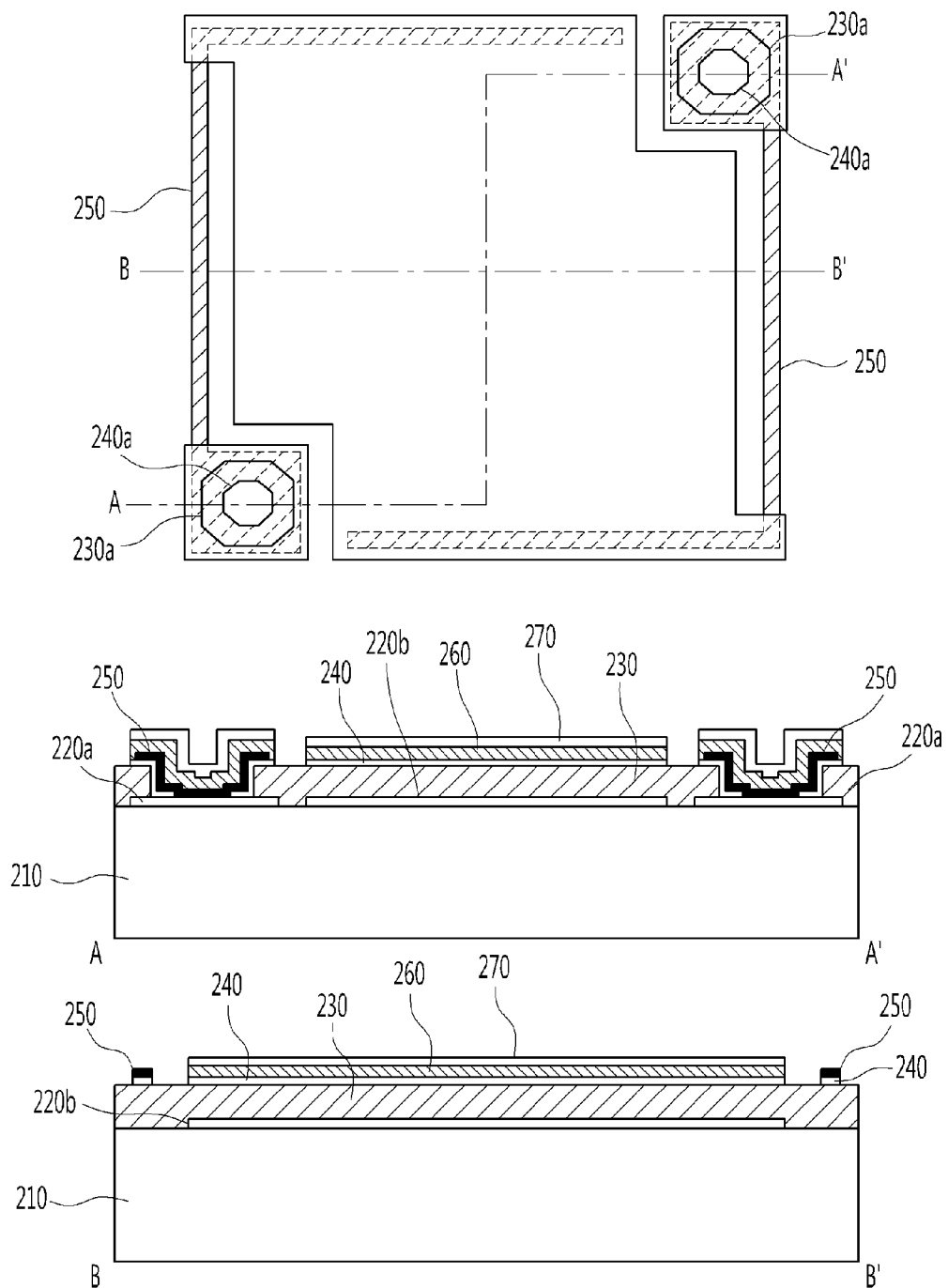

After completing the dry etching process, the photoresist pattern 280 is removed to form the structure shown in FIG. 3K.

Figure 3L:
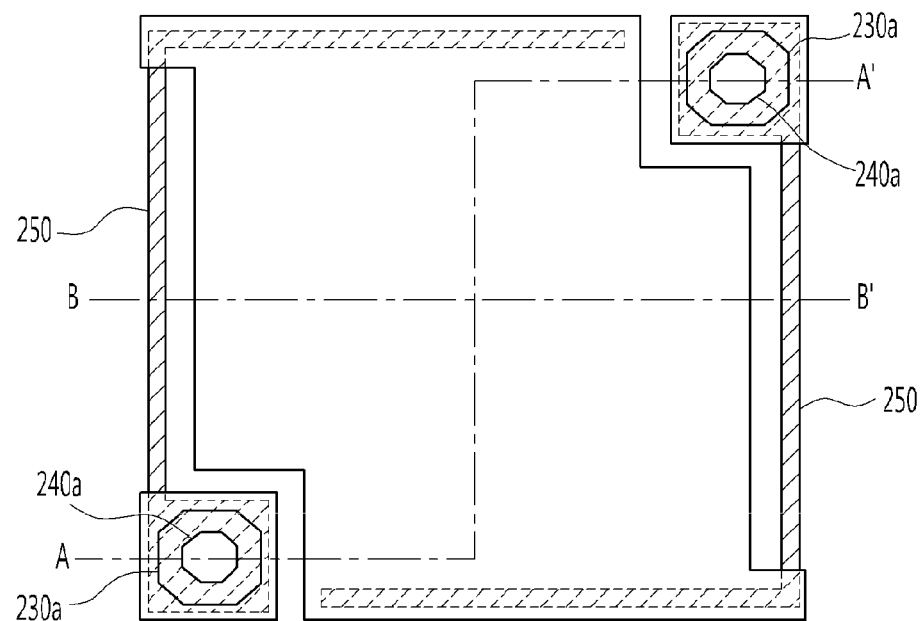
Figure 3L:
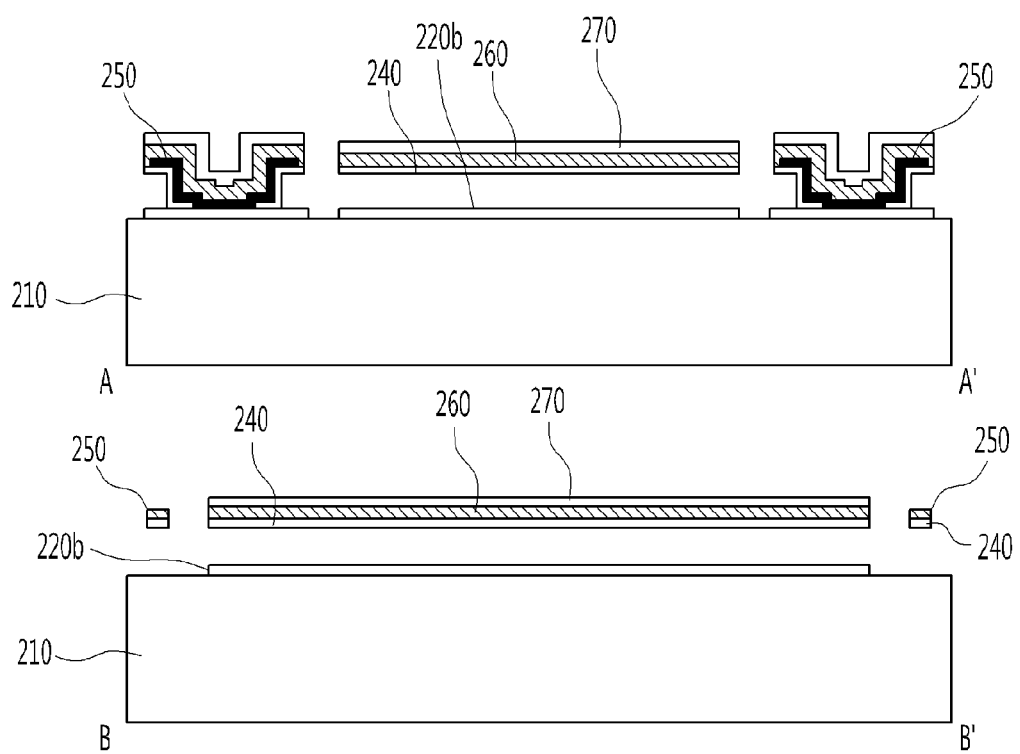

Then, the sacrificial layer 230 is removed using oxygen plasma, and thus the infrared detection sensor is completed as shown in FIG. 3L.

In the present invention as described above, without performing an additional lithography process in a process for patterning a membrane of a conventional process for fabricating a sensor, the material constituting an upper portion of the sensing electrode 250 in the supporting arm region is easily removed by means of a high etch selectivity of the sensing electrode 250 so that the thin supporting arm 200c having low thermal conductivity can be easily formed.

In other words, according to the present invention, a thermal insulation characteristic of the sensor structure is improved, and thus the infrared detection sensor having enhanced sensitivity can be easily manufactured As compared with a conventional infrared detection sensor, a high fill-factor can be obtained so that the infrared detection sensor having an enhanced infrared ray-absorbance can be manufactured.

An infrared detection sensor according to the present invention has an advantage that thermal insulation characteristics of a sensor structure are improved by a thin supporting arm having low thermal conductivity so that excellent sensitivity can be obtained.

In the infrared detection sensor according to the present invention, in addition, there is no need to complicate a shape of the supporting arm or lengthen the supporting arm in order to lower the thermal conductivity of the supporting arm, and thus a high fill-factor can be obtained to enhance an infrared ray-absorbance.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. An infrared detection sensor, comprising:
    a substrate on which a metal pad and a reflection layer are formed;
    a sensor structure spaced a predetermined distance from the reflection layer and including a sensing layer having a resistance value which is varied according to a change in temperature, a lower protection layer formed below the sensing layer and an upper protection layer formed on the sensing layer;
    an anchor formed on the metal pad and having a predetermined thickness, the anchor including the sensing layer, a sensing electrode formed below the sensing layer to transmit a change in resistance of the sensing layer to the metal pad, the lower protection layer and the upper protection layer; and
    a supporting arm extending from the anchor to support the sensor structure,
    wherein the sensing layer formed on the sensing electrode and the upper protection layer are removed from the supporting arm region to form the supporting arm composed of the sensing electrode and the lower protection layer.

2. The infrared detection sensor of claim 1, wherein the substrate comprises a read-out integrated circuit formed therein and the metal pad is electrically connected to the read-out integrated circuit.

3. The infrared detection sensor of claim 1, wherein the sensing layer is formed of one of amorphous silicon, polycrystalline silicon and vanadium oxide.

4. The infrared detection sensor of claim 1, wherein the sensing electrode is formed of one of titanium, titanium nitride and a nickel-chrome alloy.

5. The infrared detection sensor of claim 1, wherein the lower protection layer and the upper protection layer are formed of a silicon nitride layer or a silicon oxide layer.

6. A method of fabricating an infrared detection sensor, comprising;
    forming a metal pad and a reflection layer on a substrate in which a read-out integrated circuit is formed, and forming a sacrificial layer having a predetermined thickness on the substrate;
    forming a lower protection layer on the sacrificial layer, and forming a sensing electrode on an anchor region and a supporting arm region;
    forming a sensing layer to cover the sensing electrode, and forming an upper protection layer on the sensing layer;
    patterning the upper protection layer, the sensing layer and the lower protection layer, and forming a sensor structure and a supporting arm; and
    etching the sacrificial layer,
    wherein, in patterning the upper protection layer, the sensing layer and the lower protection layer, the upper protection layer and the sensing layer formed on the sensing electrode in the supporting arm region are removed by the patterning process to form the supporting arm composed of the sensing electrode and the lower protection layer.

7. The method of claim 6, wherein forming the metal pad and the reflection layer further comprises forming an anchor pattern on the sacrificial layer to expose the metal pad.

8. The method of claim 7, wherein forming the lower protection layer on the sacrificial layer comprises;

forming a lower protection layer on the sacrificial layer on which the anchor pattern is formed;

forming a contact hole on the lower protection layer to expose the metal pad;

forming the sensing electrode in contact with the exposed metal pad; and patterning the sensing electrode such that the sensing electrode remains on the anchor region and the supporting arm region.

9. The method of claim 8, wherein the sensing electrode is formed of one of titanium, titanium nitride and a nickel-chrome alloy.

10. The method of claim 6, wherein the sensing layer is formed of one of amorphous silicon, polycrystalline silicon and vanadium oxide.

11. The method of claim 6, wherein patterning the upper protection layer, the sensing layer and the lower protection layer comprises:

forming a photoresist pattern on a sensor structure region and the anchor region; and dry etching the upper protection layer and the sensing layer formed on the sensing electrode in the supporting arm region using the photoresist pattern, forming the supporting arm composed of the sensing electrode and the lower protection layer by stopping the etching on the sensing electrode, and dry etching and patterning the upper protection layer, the sensing layer and the lower protection layer using the photoresist pattern to form a sensor structure.

12. The method of claim 11, wherein, in dry etching the upper protection layer and the sensing layer formed on the sensing electrode in the supporting arm region, the upper protection layer, the sensing layer and the lower protection layer are dry-etched by means of plasma using a mixture gas composed of at least one of tetrafluoromethane ($CF_4$), fluoroform ($CHF_3$), argon (Ar) and oxygen (O).

* * * * *